US006665163B2

United States Patent
Yanagisawa (10) Patent No.: US 6,665,163 B2
(45) Date of Patent: Dec. 16, 2003

(54) METHOD FOR CONTROLLING FAN IN COMPUTER SYSTEM

(75) Inventor: Takashi Yanagisawa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 09/797,222

(22) Filed: Mar. 1, 2001

(65) Prior Publication Data
US 2002/0126431 A1 Sep. 12, 2002

(30) Foreign Application Priority Data
Jan. 3, 2001 (JP) ........................................ 2001-056284

(51) Int. Cl.[7] ................................................ H02H 5/04
(52) U.S. Cl. ........................................ 361/103; 361/695
(58) Field of Search ................................ 361/687, 694, 361/695, 103; 324/501, 584; 713/600; 700/278, 299, 300; 307/117

(56) References Cited

U.S. PATENT DOCUMENTS 5,513,361 A  * 4/1996 Young .......................... 713/320
5,664,118 A  * 9/1997 Nishigaki et al. ............. 710/304
5,884,049 A  * 3/1999 Atkinson ..................... 361/687

* cited by examiner

Primary Examiner—Ronald W. Leja
(74) Attorney, Agent, or Firm—Carlos Munoz-Bustamante

(57) ABSTRACT

In a docking station for a PC, a PCI adapter, an IDE controller, and a PC card controller operate when a PCI clock is supplied from the PC, and stop when the supply of the PCI clock is stopped by the PC entering a sleep mode. A driving signal output circuit outputs an actuation signal to a cooling fan drive circuit when the PCI clock is supplied thereto, and outputs a stop signal to the cooling fan drive circuit when the supply of the PCI clock is stopped. The cooling fan drive circuit includes a temperature sensor for detecting the internal temperature of a power supply unit, and controls on/off of the cooling fan on the basis of the detected temperature by this temperature sensor and an output signal from the driving signal output circuit.

11 Claims, 8 Drawing Sheets

METHOD FOR CONTROLLING FAN IN COMPUTER SYSTEM

FIELD OF THE INVENTION

The present invention relates to a computer and a method for controlling a cooling fan in a computer, and in particular, to the control of a cooling fan in a computer which can connect to an external device in an expansion unit.

BACKGROUND OF THE INVENTION

An expansion unit to expand functions of a notebook personal computer (PC), for example, a docking station, has a cooling fan for cooling a device and power supply mounted in the docking station.

Conventionally, this cooling fan is controlled on the basis of temperature inside a power supply detected by a temperature sensor provided inside the power supply. For example, control is performed so that the cooling fan is operated and the inside of the docking station is cooled if detected temperature is higher than predetermined temperature, and that the cooling fan is stopped if the detected temperature is equal to or lower than the predetermined temperature.

However, there is not certain correlation between the temperature inside the power supply and the temperature of a device requiring the cooling by the cooling fan, and only the temperature inside the power supply is measured, and hence there is a case that it is not possible to surely actuate the cooling fan when the temperature of the device is high.

Furthermore, since various devices are mounted in the expansion unit such as the docking station, it is not possible to know beforehand which portion is easy to be heated, and it is difficult to provide a temperature sensor beforehand at a portion where temperature is easy to rise.

By the way, recently, a standard called ACPI (Advanced Configuration and Power Interface) which allows power supply management to be performed predominantly by an operating system is well known as power management (power supply management) for a PC.

In addition, according to the PC 99 design guide which is a hardware specification of a computer laid down by Microsoft Corporation, under the above-described ACPI environment, a behavior of a PC should look the same in a sleep mode and in a power-off state for a user.

Thus, in case of the above-described cooling fan, for example, since the cooling fan stops and does not generate noise at the time of the power-off state, the cooling fan must be also stopped for preventing the noise from being generated in the sleep mode.

However, in order to stop the cooling fan also in the sleep mode, a temperature condition for actuating the cooling fan must be set higher than normal to prevent the cooling fan from being accidentally operated in the sleep mode.

Thus, the cooling fan may not operate even when the PC operates normally, and hence there is a problem that the cooling fan cannot sufficiently cool a device that is mounted in the docking station.

SUMMARY OF THE INVENTION

The present invention is provided in consideration of the above-described facts, and an object of the present invention is to provide a computer, which can adequately control the cooling fan to cool the device mounted in the expansion unit, and a method for controlling the cooling fan.

In order to achieve above-described objects, a computer according to the present invention can connect to at least one external device, which operates by, for example, a clock being supplied at least from the external thereto. Such external devices include, for example, a storage device such as a hard disk, a PC card, a CD-ROM drive, a DVD-ROM drive, and the like, and operated by electric power and clock being supplied from the external thereto.

These external devices are used, for example, by being connected with a computer main body and can be mounted in an expansion unit for expanding functions, and an expansion slot provided in the computer main body. In addition, the computer main body or expansion unit has a cooling fan for cooling a power supply device, which supplies electric power to an external device and the above-described external device.

In such a computer, detection means detects the supply of a clock to the external device. Thus, the detection means detects whether the clock is supplied to the external device and the external device is under operation. Here, the state in which the clock is not supplied is, for example, a case that the computer is in the sleep mode.

Signal output means outputs an actuation signal to actuation means for actuating the cooling fan, on the basis of the clock. For example, when the clock is detected, namely, when it is detected that the clock is supplied to the external device and the computer is in an operating state, the signal output means outputs the actuation signal for actuating the cooling fan, to the actuation means. The actuation means is composed of, for example, a switching device such as a MOS-FET, and drives the cooling fan with the actuation signal. In addition, when the clock is not detected, namely, for example, when the computer is in the sleep mode, the supply of the clock to the external device is stopped, and when the external device is in a non-operating state, the signal output means outputs a stop signal for stopping the cooling fan, to the actuation means. Owing to this, the cooling fan is stopped.

In this manner, since the actuation/non-actuation of the cooling fan is controlled by whether the clock is supplied to the external device, it is possible to surely actuate the cooling fan when the external device operates, and hence it is possible to fully cool the external device.

In addition, it is possible to make the detection means include integration means, integrating the clock signal, in an input stage. Owing to this, the signal output means can output a signal at a fixed level while the clock signal is inputted and can make this as an actuation signal. In this manner, it is possible to actuate the cooling fan in simple configuration.

Additionally, if the temperature inside the computer is still high like just after shifting from a normal operation mode to a sleep mode even if the clock is not supplied to the external device, it is preferable to perform cooling by the cooling fan.

Then, it can be performed that the computer further includes at least one temperature sensor detecting the temperature inside the computer, and the signal output means outputs the actuation signal to the actuation means on the basis of the clock and detected temperature by the temperature sensor.

For example, if the clock is not detected and the detected temperature by the at least one temperature sensor is equal to or higher than a predetermined value, that is, as described above, if the temperature of the external device and power supply device is still high just after shifting from the normal operation mode to the sleep mode, the actuation signal is outputted to the actuation means.

Owing to this, if the temperature inside the computer is still high even if the clock is not supplied to the external device, it is possible to perform cooling by the cooling fan, and hence it is possible to cool the inside of the computer more immediately. In addition, one or plural temperature sensors can be provided.

In a method for controlling a cooling fan in a computer that can connect to an external device and has a cooling fan for cooling the external device, the method for controlling the cooling fan according to the present invention comprises the steps of: detecting the supply of a clock from the computer to the external device; and actuating the cooling fan on the basis of the clock.

Owing to this, it is possible to surely actuate the cooling fan when the external device operates, and hence it is possible to fully cool the external device.

In addition, it can be also performed to actuate the cooling fan on the basis of the clock and detected temperature by the temperature sensor by further detecting the internal temperature of the computer.

Owing to this, if the temperature inside the computer is still high even if the clock is not supplied to the external device, it is possible to perform cooling by the cooling fan, and hence it is possible to cool the inside of the computer more immediately.

DETAILED DESCRIPTION OF THE INVENTION

Figure 1:
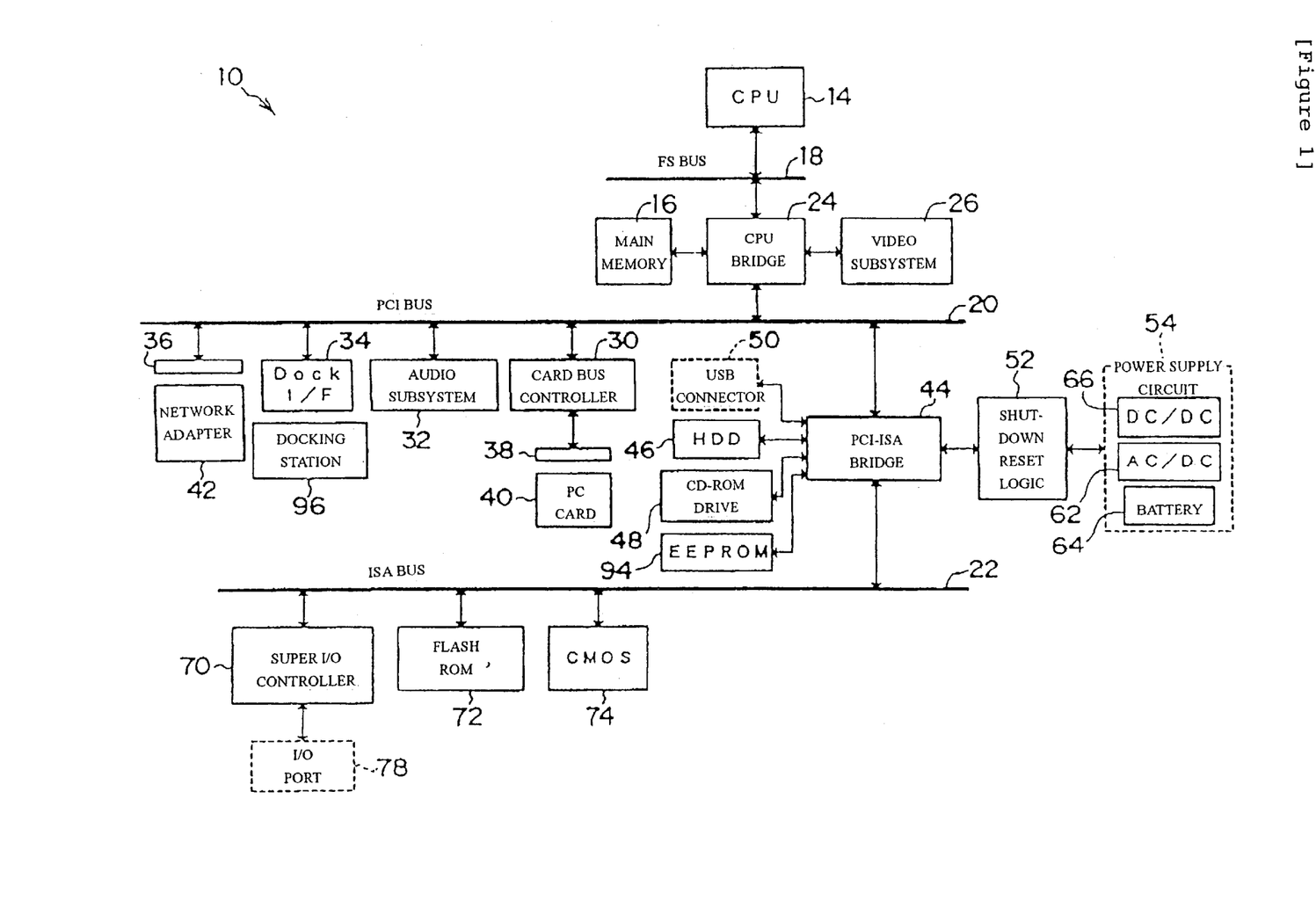
FIG. 1 is a block diagram showing the schematic configuration of a computer system according to this embodiment.

Hereinafter, a first embodiment of the present invention will be described with reference to the drawings. FIG. 1 schematically shows the hardware organization of a computer system 10, composed of a typical personal computer (PC) suitable for implementing the present invention, every subsystem.

An example of a PC implementing the present invention is a notebook PC 12 (see FIG. 2) that conforms to the OADG (PC Open Architecture Developer's Group) specifications, and has Microsoft Corporation's "Windows98 or NT" as an operating system (OS). Hereinafter, each part of the computer system 10 will be explained.

A CPU 14 that is a brain of the entire computer system 10 executes various programs under the control of the OS. The CPU 14 can be, for example, a CPU chip "Pentium", "MMX technology Pentium", or "Pentium Pro" made by Intel Corp., a CPU made by AMD Inc. or other company, or "PowerPC" made by IBM Corp. The CPU 14 is configured with including a L2 (level 2)-cache that is high-speed memory to shorten total access time to main memory 16 by temporarily storing extremely limited code and data that are frequently accessed. The L2-cache is composed of an SRAM (Static RAM) chip in general.

The CPU 14 is interconnected with each hardware component described later through three classes of buses, that is, an FS (Front Side) bus 18 as a processor-direct-coupled bus that is connected directly to an own external pin, a PCI (Peripheral Component Interconnect) bus 20 as a high-speed I/O device bus, and an ISA (Industry Standard Architecture) bus 22 as a low-speed I/O device bus.

In general, the FSB 18 and PCI bus 20 are connected by a CPU bridge (host-PCI bridge) 24 that is called a memory/PCI control chip. The CPU bridge 24 of this embodiment has configuration including a memory controller function for controlling access operation to the main memory 16 and data buffer and the like for absorbing the difference of data transfer rates between the FSB 18 and PCI bus 20. For example, an Intel 440BX chip can be used for this purpose.

The main memory 16 is writable memory used as a read-in area of execution programs in the CPU 14, or as a work area where processing data of the execution programs is written. The main memory 16 consists of, for example, several DRAM (dynamic RAM) chips.

In addition, here, the execution programs include various device drivers for physically operating peripheral devices, application programs applied to specific operations, and firmware such as a BIOS stored in flash ROM 72.

The PCI bus 20 is a bus that can perform comparatively high-speed data transmission, and PCI devices that are driven at comparatively high speed, like a Card Bus controller 30 are connected to this. In addition, PCI architecture is started from a proposal of Intel Corp., and realizes, so-called, a PnP (Plug and Play) function.

Figure 2:
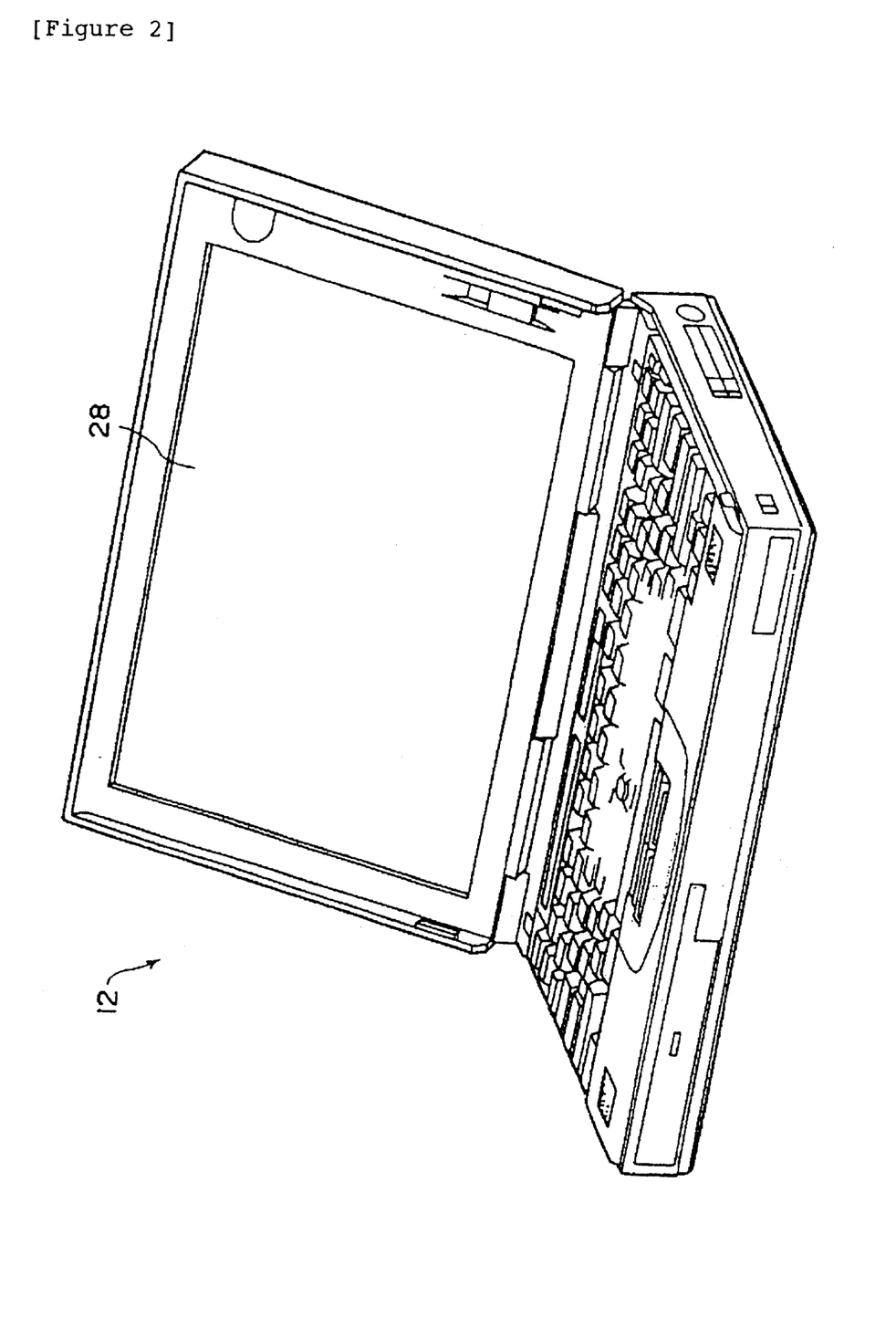
FIG. 2 is a perspective view showing the appearance of a notebook PC.

A video subsystem 26 is a subsystem to realize a function relating to a video system, and includes a video system controller that actually processes a rendering instruction from the CPU 14, once writes the rendering information, which is processed, in video memory (VRAM), reads the rendering information from the VRAM, and outputs the rendering information as rendering data to a liquid crystal display (LCD) 28 (see FIG. 2). In addition, the video system controller can convert a digital video signal into an analog video signal by a digital-analog converter (DAC) attached. The analog video signal is outputted to a CRT port (not shown) through a signal line.

In addition, the PCI bus 20 connects to the Card Bus controller 30, an audio subsystem 32, a docking station interface (Dock I/F) 34 and a mini-PCI slot 36 respectively. The Card Bus controller 30 is a dedicated controller for directly coupling a bus signal in the PCI bus 20 to an interface connector (Card Bus) of a PCI Card Bus slot 38. In the Card Bus slot 38, for example, a PC card 40 is loaded, the PC card 40 being located on a wall surface of the body of the PC 12 and conforms to specifications laid down by PCMCIA (Personal Computer Memory Association)/JEIDA (Japan Electronic Industry Development Association).

Figure 3:
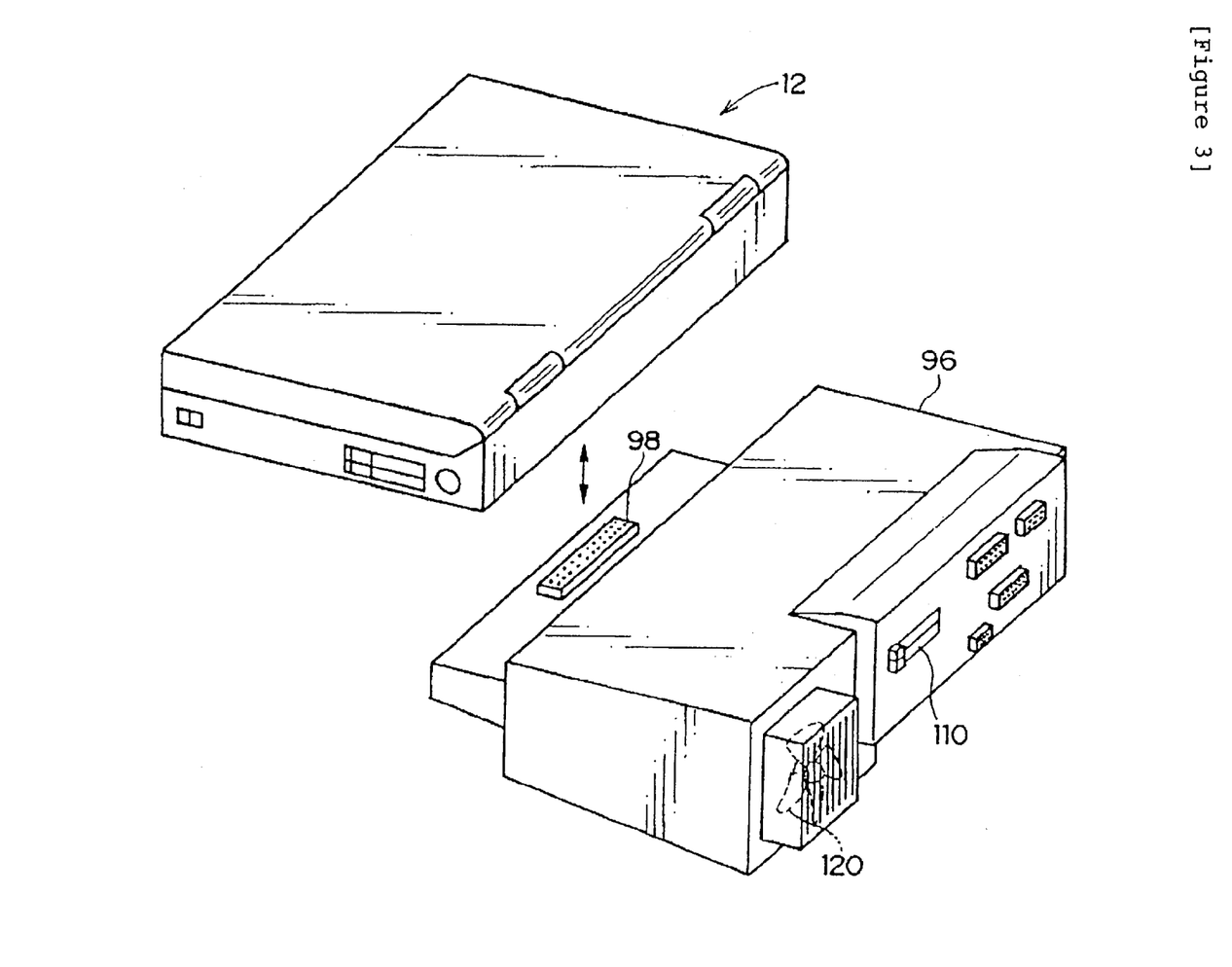
FIG. 3 is a perspective view showing the appearance of the notebook PC and a docking station.
Figure 4:
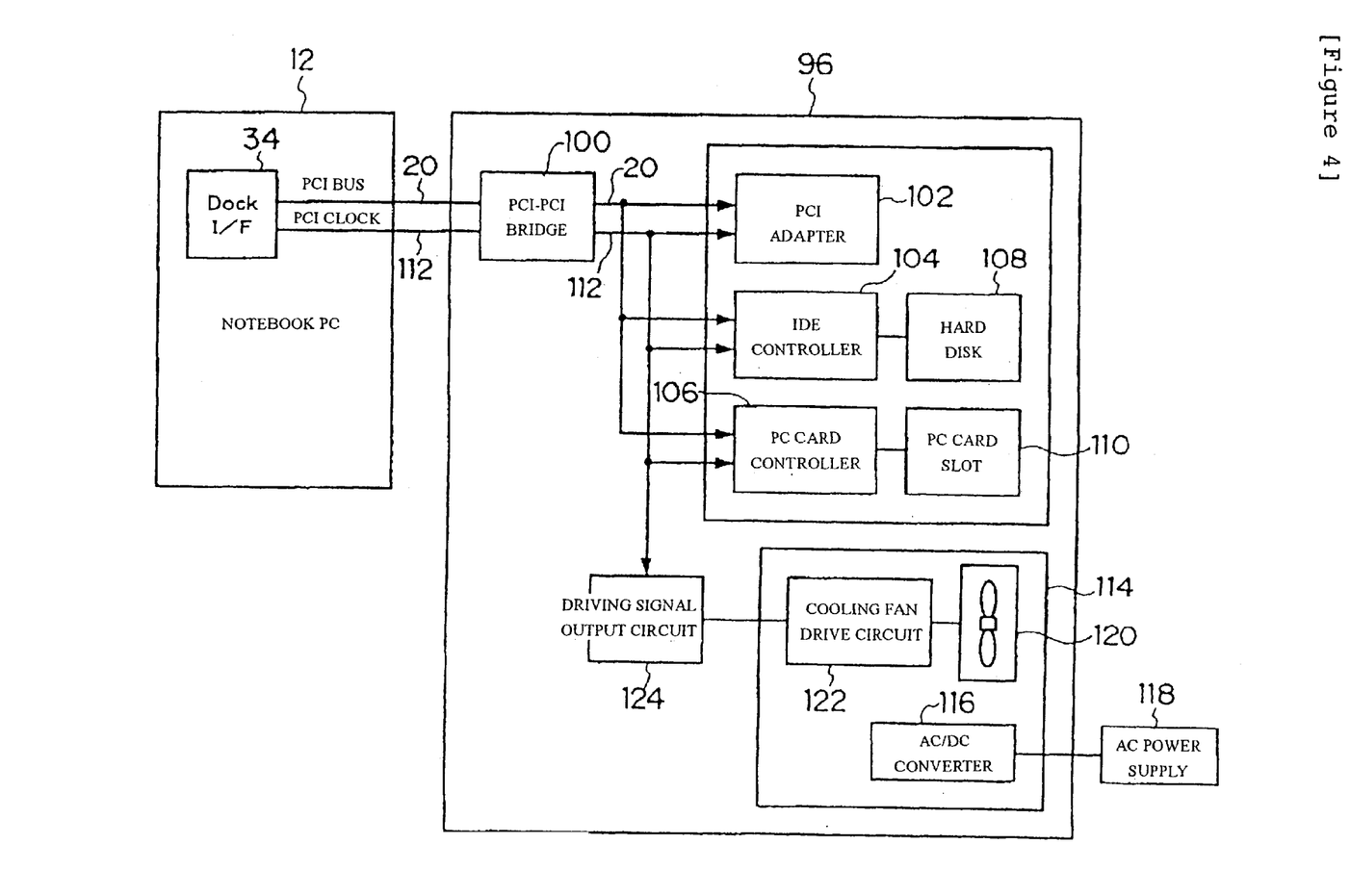
FIG. 4 is a block diagram showing the schematic configuration of the docking station.

The Dock I/F 34 is hardware to connect the docking station 96 (see FIG. 3, too) to the PC 12, and when a connector of the PC 12, which is not shown, is connected to the connector 98 of the docking station 96 shown in FIG. 3, as shown in FIG. 4, the PCI-PCI bridge 100 of the docking station 96 is connected to the Dock I/F 34.

The PCI-PCI bridge 100, as shown in FIG. 4, connects to a PCI adaptor 102 to control peripheral devices for the PCI bus, an IDE controller 104 to control peripheral devices for the IDE, and a PC card controller 106 to control PC cards. In addition, the IDE controller 104 connects to a hard disk 108, and the PC card controller 106 connects to a PC card slot 110.

These PCI adapter 102, IDE controller 104, and PC card controller 106 are connected through the PCI-PCI bridge 100 to the PCI bus 20 of the PC 12, and operates with a PCI clock 112 at a predetermined frequency (for example, 33 MHz) that is supplied from the PC 12.

Furthermore, the PCI adapter 102, IDE controller 104, and PC card controller 106 operate with electric power supplied by an AC/DC converter 116 in the power supply unit 114. The AC/DC converter 116 converts AC voltage (for example, 100V), which is supplied from an external AC power supply 118, into predetermined DC voltage, and supplies the DC voltage to the PCI adapter 102, IDE controller 104, PC card controller 106, and the like.

The AC/DC converter 116 is cooled by a cooling fan 120. The cooling fan 120 is driven by a cooling fan drive circuit 122. The cooling fan drive circuit 122 has a temperature sensor (described later), and drives the cooling fan 120 on the basis of a detection result of this temperature sensor and a driving signal outputted from a driving signal output circuit 124.

The driving signal output circuit 124 detects a PCI clock 112 outputted to the PCI adapter 102, IDE controller 104, and PC card controller 106. In addition, when detecting the PCI clock 112, the driving signal output circuit 124 outputs a cooling fan driving signal to the cooling fan drive circuit 122. On the contrary, if not detecting the PCI clock 112, the driving signal output circuit 124 outputs a cooling fan stop signal to the cooling fan drive circuit 122.

Figure 5:
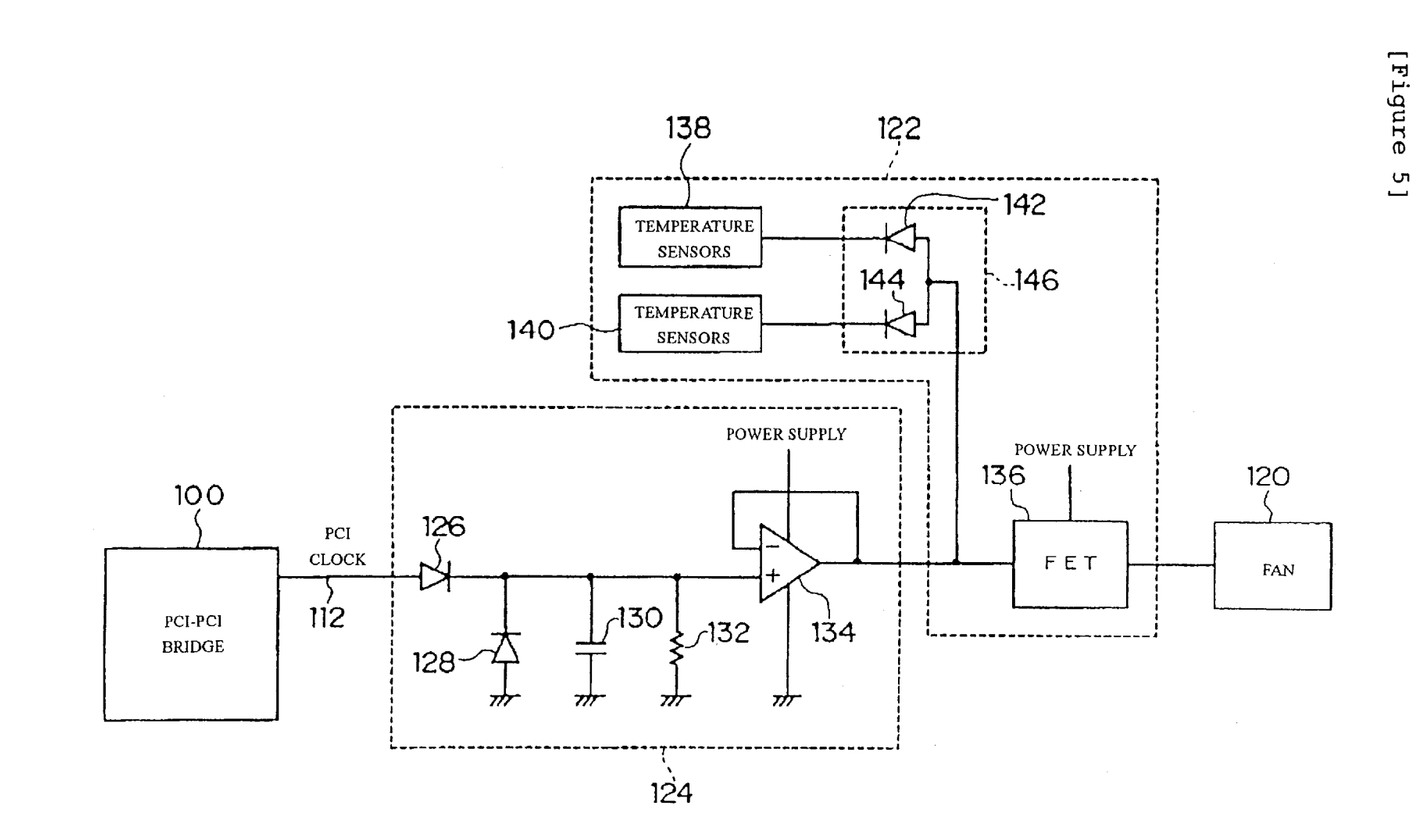
FIG. 5 is a schematic diagram of a driving signal output circuit.

FIG. 5 shows a concrete schematic diagram of the driving signal output circuit 124 and cooling fan drive circuit 122.

As shown in FIG. 5, the driving signal output circuit 124 consists of an integration circuit including diodes 126, 128, a capacitor 130, a resistor 132, and a comparator 134. An anode of the diode 126 is connected to the PCI-PCI bridge 100, and a cathode of the diode 126 is connected to a cathode of the diode 128, one end of the capacitor 130, one end of the resistor 132, and a non-inverting input terminal of the comparator 134. An anode of the diode 128, another end of the capacitor 130, and another end of the resistor 132 are grounded together. An output terminal of the comparator 134 is connected to a MOS-FET 136 for driving the non-inverting input terminal and the cooling fan 120.

On the other hand, the cooling fan drive circuit 122 has two temperature sensors 138 and 140. These temperature sensors 138 and 140 are provided inside the power supply unit 114, and detect the internal temperature of the power supply unit 114. If the internal temperature is equal to or higher than predetermined temperature, any one of these temperature sensors 138 and 140, for example, outputs a high level signal, and if being lower than the predetermined temperature, any one of them outputs a low level signal.

Output signals of the temperature sensors 138 and 140 are wired-ORed (logically ORed) by a wired-OR gate 146 that is composed of diodes 142 and 144, and are outputted to the MOS-FET 136.

In this manner, the MOS-FET 136 receives the output signal from the comparator 134 and a logical-ORed value of the output signals of the temperature sensors 138 and 140. Thus, a wired-ORed (logically ORed) value of the output signal from the comparator 134 and the output of the wired-OR gate 146 is inputted to the MOS-FET 136.

Therefore, the on/off of the cooling fan 120 is controlled on the basis of the PCI clock 112 and the internal temperature of the power supply unit 114 detected by the temperature sensors 138 and 140.

In addition, the mini-PCI slot 36 connects to, for example, a network adapter 42 for connecting the computer system 10 to a network (e.g. LAN).

The PCI bus 20 and ISA bus 22 are interconnected by the PCI-ISA bridge 44. The PCI-ISA bridge 44 has a bridge function between the PCI bus 20 and ISA bus 22, a DMA controller function, a programmable interrupt controller (PIC) function, a programmable interval timer (PIT) function, an IDE (Integrated Drive Electronics) interface function, a USB (Universal Serial Bus) function, and a SMB (System Management Bus) interface function, and incorporates a real time clock (RTC). For example, an Intel PIIX4 chip can be used for this purpose.

In addition, the DMA controller function is a function for executing data transfer between a peripheral device (e.g. FDD) and main memory 16 without intervention of the CPU 14. In addition, the PIC function is a function of letting a predetermined program (interrupt handler) be executed in response to an interrupt request from a peripheral device (IRQ). Furthermore, the PIT function is a function of generating a timer signal in a predetermined period, and its generation period is programmable.

In addition, the IDE interface provided by the IDE interface function connects to the IDE hard disk drive (HDD) 40, as well as an IDE CD-ROM drive 48 by ATAPI (AT Attachment Packet Interface). In addition, instead of the IDE CD-ROM drive 48, another type of an IDE device such as a DVD (Digital Video Disc or Digital Versatile Disc) drive can be connected. External storage devices such as the HDD 46 and the CD-ROM drive 48 each are contained in, for example, a containing location called a "swappable bay" inside the body of the PC 12. These external storage devices that are provided as standard equipment may be exchangeably and exclusively mounted with other devices such as an FDD and a battery pack.

In addition, a USB port is provided in the PCI-ISA bridge 44, and this USB port is connected to, for example, a USB connector 50 provided on a wall surface of the PC 12. The USB supports a function of plugging or unplugging a new peripheral device (USB device) in a power-on state (a hot plugging function), a function of automatically recognizing a new peripheral device and performing resetting system configuration (Plug and Play function). For one USB port, up to 63 USB devices can be connected in daisy-chain connection. Examples of the USB devices are various devices such as a keyboard, a mouse, a joystick, a scanner, a printer, a modem, a display monitor, and a tablet.

Furthermore, the PCI-ISA bridge 44 connects through the SM bus to an EEPROM 94. The EEPROM 94 is memory for storing information such as a password that is registered by a user, a supervisor password, and a manufacture serial number, and is made to be nonvolatile and electrically rewritable for memory contents.

In addition, the PCI-ISA bridge 44 is connected through a shutdown reset logic 52 to a power supply circuit 54. Inside a core chip constituting the PCI-ISA bridge 44, a power supply-managing unit managing a power supply state of the computer system 10 is provided. This power supply managing unit and power supply circuit 54 transmits and receives various types of signals through the shutdown-reset logic 52. Owing to this transmission and reception of signals, the power supply managing unit of the PCI-ISA bridge 44 recognizes an actual power supply state from the power supply circuit 54 to the computer system 10. The power supply circuit 54 controls power supply to the computer system 10 according to an instruction from the power supply-managing unit of the PCI-ISA bridge 44.

The ISA bus 22 is a bus whose data transfer rate is lower than that of the PCI bus 20, and is used for connecting a super I/O controller 70, flash ROM 72 consisting of EEPROM, CMOS 74, and peripheral devices that operate at comparatively low speed such as a keyboard/mouse controller (nothing shown).

An I/O port 78 is connected to the super I/O controller 70. The super I/O controller 70 controls the driving of a floppy disk drive (FDD), input/output of parallel data through a parallel port (PIO), and input/output of serial data through a serial port (SIO).

The flash ROM 72 is memory for storing various BIOS programs, and is made to be nonvolatile and electrically rewritable for memory contents. In addition, the BIOS programs are written in ASL (ACPI Machine Language). The CMOS 74 is composed of volatile semiconductor memory connected to a backup power supply, and is nonvolatile to function as high-speed memory means.

In addition, in order to constitute the computer system 10, a lot of electric circuits are necessary besides those shown in FIG. 1. However, these are apparent for those skilled in the art, and because these do not constitute the substance of the present invention, their description will be omitted in this specification. Furthermore, in order to avoid the complication of drawings, only some connections between respective hardware blocks in the drawings is shown.

Next, actions of this embodiment will be described. The computer system 10 according to this embodiment is a PC based on the ACPI standard, and as shown in the next table 1, a plurality of power supply states (S0 to S5, and G3) is defined as power supply states.

TABLE 1

| State of power supply | APM | Actual State | Condition for Returning to S0 |
|---|---|---|---|
| S0 | Operational | Operational | |
| S1 | Standby | Power-off of some peripheral devices | Occurrence of a predetermined event |
| S2 | | | |
| S3 | Suspend | Power-off of peripheral devices with operating status stored in memory | Occurrence of a predetermined event |
| S4 | Hibernation | Power-off of a main part with operating status stored in HDD | Occurrence of a predetermined event |
| S5 | SoftOFF | Power-off of all except a power supply managing unit in a core chip | Only switch-on of a power switch |
| G3 | MechOFF | Power-off of all including the power supply managing unit | Only switch-on of a power switch |

In addition, "APM" in the Table 1 denotes correspondence of each power supply state of S0 to S5, and G3, and each power supply state defined in APM (Advanced Power Management) standard. Furthermore, the states of S1 to S3 may also collectively called "Standby", and the states of S5 and G3 may also collectively called "Shutdown". Alternatively, the states of S1 to S4 may also collectively called "Sleep".

Hereinafter, as an example, in a state that the PC 12 is installed in the docking station 96, the operation of the cooling fan will be described when the power supply state changes from the S0 state (operating state) to the states of S1 to S4 (sleep state), and when the power supply state changes from the states of S1 to S4 (sleep state) to the S0 state (operating state).

If a user does not operate the PC 12 and predetermined time elapses, the power supply state changes from the operating condition to the sleep state. At this time, the supply of the PCI clock from the PC 12 to the docking station 96 is stopped. Owing to this, the operation of peripheral devices such as the hard disk 108 mounted in the docking station 96 is stopped.

Figure 6:
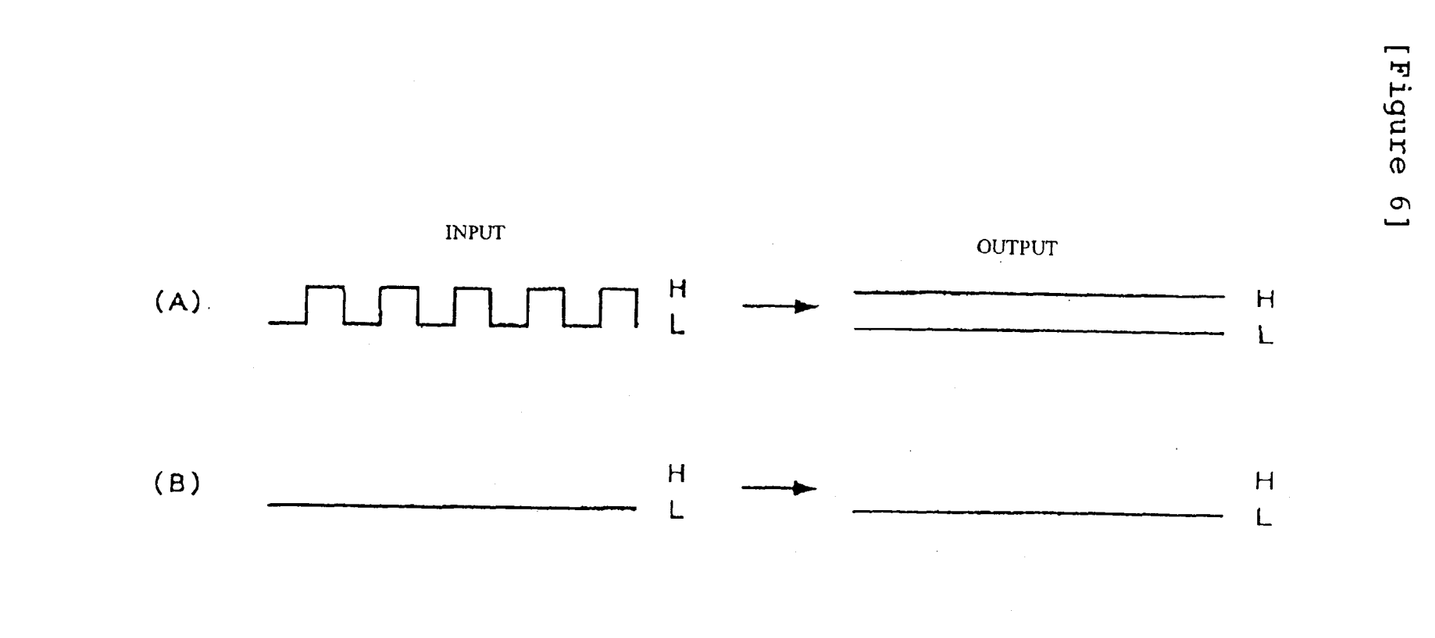
FIG. 6 is a chart showing output waveforms of the driving signal output circuit.

Hence, as shown in FIG. 6(B), a low level signal is inputted into the driving signal output circuit 124, and the driving signal output circuit 124 outputs a low level signal to the MOS-FET 136.

At this time, if all the detected temperatures, which are detected by the temperature sensors 138 and 140, are lower than predetermined temperature, the wired-OR circuit 142 outputs a low level signal to the MOS-FET 136.

Therefore, a logically-ORed value of the low level signal, which is an output of the driving signal output circuit 124, and a low level signal which is an output of the cooling fan drive circuit 122, that is, a low level signal is inputted into the MOS-FET 136. Owing to this, the MOS-FET 136 is turned off, and hence the cooling fan 120 is stopped.

In this manner, if the PC 12 becomes in the sleep state, the peripheral devices mounted in the docking station 96 each become a non-running state, and further all the detected temperatures which are detected by the temperature sensors 138 and 140 are lower than the predetermined temperature, that is, if the internal temperature of the power supply unit 114 is not so high, the cooling fan 120 is stopped. Therefore, it is possible in an energy saving state as the sleep state to surely stop the cooling fan 120, and to make the cooling fan behave similarly in a power-off state.

On the other hand, if the detected temperature by any one of the temperature sensors 138 and 140 is equal to or higher than the predetermined temperature, the wired-OR circuit 142 outputs a high level signal. Therefore, a logically-ORed value of the low level signal, which is an output of the driving signal output circuit 124, and a high level signal which is an output of the cooling fan drive circuit 122, that is, a high level signal is inputted into the MOS-FET 136. Owing to this, the MOS-FET 136 is turned on, and hence the cooling fan 120 is actuated.

In this manner, if the PC 12 becomes in the sleep state, the peripheral devices mounted in the docking station 96 becomes in a non-running state, and further any one of the detected temperatures which are detected by the temperature sensors 138 and 140 is equal to or higher than the predetermined temperature, that is, if the internal temperature of the power supply unit 114 is high, the cooling fan 120 is actuated.

Owing to this, it is possible to actuate the cooling fan 120 even in such a state that the internal temperature of the power supply unit 114 is high due to residual heat as just after the stop of a peripheral device, and to cool the inside of the docking station 96 immediately.

In addition, if a user performs certain operation in the sleep state, the state changes from the sleep state to the operating state. At this time, the supply of the PCI clock from the PC 12 to the docking station 96 is started. Owing to this, the operation of peripheral devices such as the hard disk 108 mounted in the docking station 96 is started. Owing to this, the PCI clock 112 as shown in FIG. 6(A) is inputted into the driving signal output circuit 124. The driving signal output circuit 124 integrates this PCI clock 112 to output the PCI clock to the MOS-FET 136. Thus, the driving signal output circuit 124 outputs a high level signal due to an input of the PCI clock 112.

At this time, if all the detected temperatures, which are detected by the temperature sensors 138 and 140, are lower than predetermined temperature, the wired-OR circuit 142 outputs a low level signal to the MOS-FET 136.

Therefore, a logically-ORed value of the high level signal, which is an output of the driving signal output circuit 124, and a low level signal which is an output of the cooling fan drive circuit 122, that is, a high level signal is inputted into the MOS-FET 136. Owing to this, the MOS-FET 136 is turned on, and hence the cooling fan is actuated.

In this manner, if the sleep mode of the PC 12 is released and peripheral devices mounted in the docking station 96 become operative, that is, if the internal temperature of the power supply unit 114 becomes high, the cooling fan 120 is actuated.

On the other hand, if the detected temperature by any one of the temperature sensors 138 and 140 is equal to or higher than the predetermined temperature, the wired-OR circuit 142 outputs a high level signal. Therefore, a logically-ORed value of the high level signal, which is an output of the driving signal output circuit 124, and a high level signal which is an output of the cooling fan drive circuit 122, that is, a high level signal is inputted into the MOS-FET 136. Owing to this, the MOS-FET 136 is turned on, and hence the cooling fan is actuated.

In this manner, if the sleep state of the PC 12 is released and peripheral devices mounted in the docking station 96 become operative, it is conceivable that the internal temperature of the power supply unit 114 becomes high. Hence, independently of the detected temperatures by the temperature sensors 138 and 140, the cooling fan 120 is actuated.

Owing to this, it is possible to surely actuate the cooling fan 120 when the peripheral devices operate.

In addition, the timing when an output of the driving signal output circuit 124 changes from a high level to a low level or vice versa does not completely synchronize with the timing of supply/stop of the PCI clock, but this does not heavily affect the cooling of the inside of the docking station 96 by the cooling fan 120.

Hereinafter, the operating conditions of the cooling fan 120 are shown.

TABLE 2

|  | PCI Clock ON | PCI Clock OFF |
|---|---|---|
| Detected temperature by any one of temperature sensors > Predetermined value | Cooling fan: ON | Cooling fan: ON |
| Detected temperatures by all the temperature sensors < Predetermined value | Cooling fan: ON | Cooling fan: OFF |

As described above, the cooling fan 120 is turned off only when the internal temperature of the power supply unit 114 is normal, that is, when the detected temperatures by the temperature sensors 138 and 140 are together lower than the predetermined temperature and the PC 12 is in the sleep state, or the power supply is turned off. In addition, when the PCI clock 112 is supplied to peripheral devices mounted in the docking station 96, the cooling fan 120 is turned on independently of the internal temperature of the power supply unit 114. Therefore, when a peripheral device mounted in the docking station 96 operates, it is possible to surely actuate the cooling fan 120, and when the PC 12 is in the sleep state, it is possible to turn off the cooling fan 120, and to make the cooling fan 120 behave similar to in the power-off state.

In addition, although, in the above description, a case that the docking station 96 is connected to the PC 12 is an exemplified, the present invention is not limited to this, but can be applied to a case that a peripheral device which is contained in a swappable bay inside the body of the PC 12 is actuated by a device interface controller actuated by the PCI clock supplied from the body of the PC 12, and a case that a PC card is actuated by the PC card controller actuated with the PCI clock supplied from the body of the PC 12.

In addition, in this embodiment, a case that the present invention is applied to a computer based on the ACPI standard such as Windows98 is described, but the present invention is not limited to this. Thus, the present invention can be applied to a computer having a device that can be connected to a device that operates with a clock supplied from the external. For example, the present invention can be also applied to a computer where a succeeding OS of Windows98 such as Windows2000 or another OS such as AIX or Linux is installed.

Next, a second embodiment of the present invention will be described. In the second embodiment, a case that the driving signal output circuit 124 is made to be a digital circuit will be described.

Figure 7:
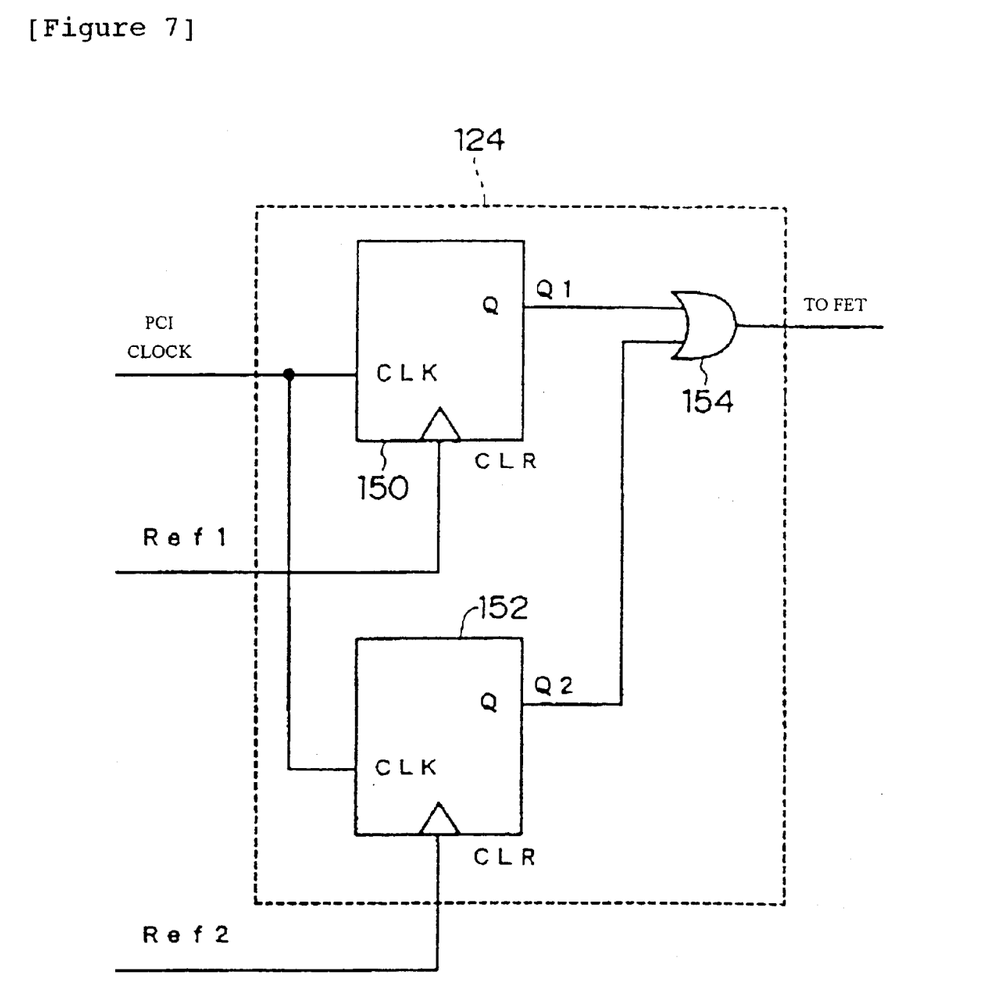
FIG. 7 is a schematic diagram showing another example of a driving signal output circuit.

As shown in FIG. 7, the driving signal output circuit 142 consists of D latch circuits 150 and 152, and an OR gate 154.

Figure 8:
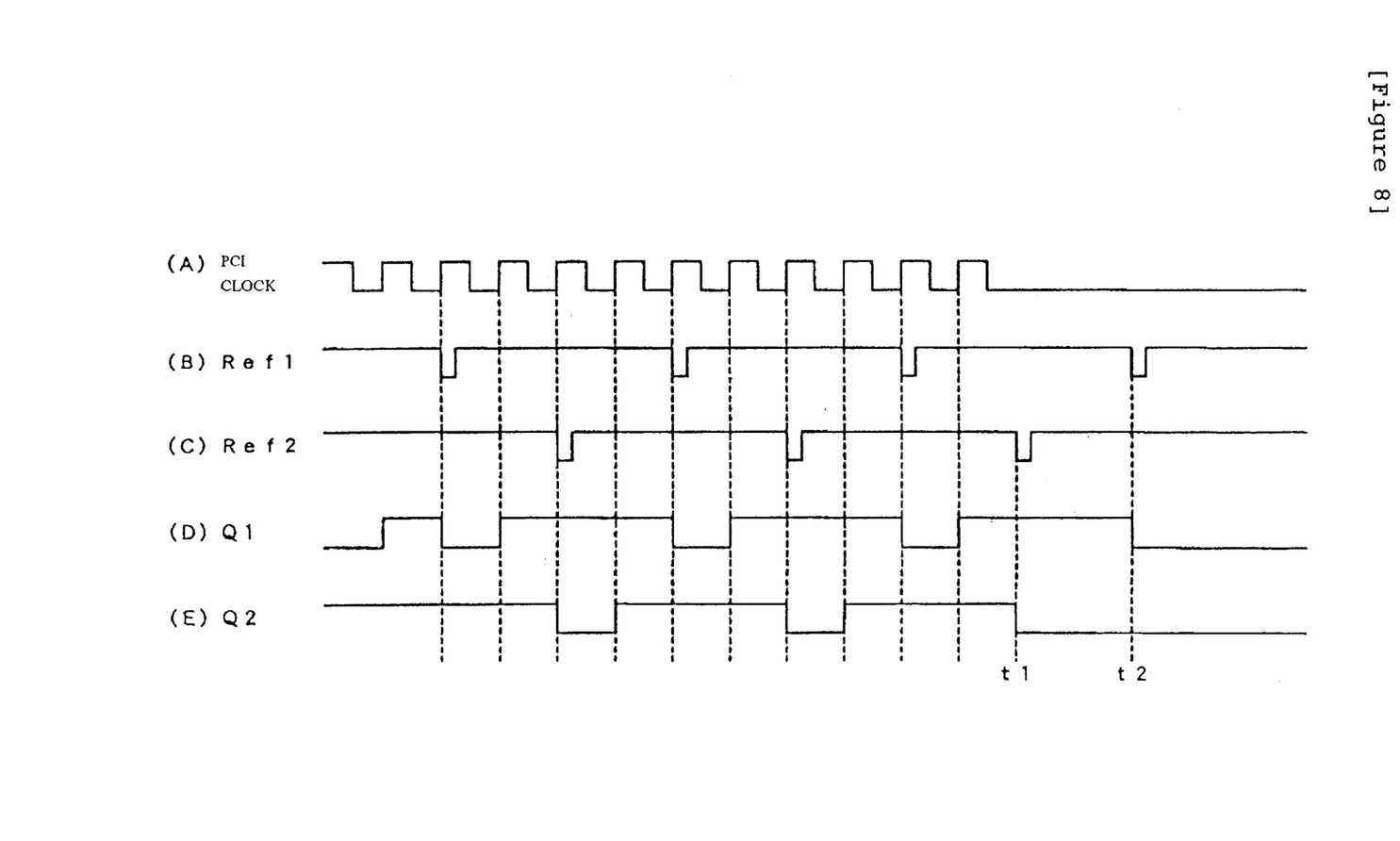
FIG. 8 is a timing chart showing an output signal of each part of the driving signal output circuit.

The PCI clock 112, as shown in FIG. 8(A), that is outputted from the PCI-PCI bridge 100 is inputted into a CLK terminal of the D latch circuit 150. If a high level signal is inputted into the CLK terminal, the D latch circuit 150 holds this to output this from a Q terminal to the OR gate 154 (Q1 signal).

A CLR terminal of the D latch circuit 150 is a terminal for clearing the Q1 signal, and a Ref1 signal, as shown in FIG. 8(B), that outputs a low level signal in a cycle sufficiently longer than that of the PCI clock 112 is inputted into the CLR terminal. Owing to this, the Q1 signal, as shown in FIG. 8(D), is cleared at the timing of the Ref1 signal becoming low. In other words, the D latch circuit 150 outputs a low level signal.

The PCI clock 112 that is outputted from the PCI-PCI bridge 100 is inputted into a CLK terminal of the D latch circuit 152 similarly to the D latch circuit 150. If a high level signal is inputted into the CLK terminal, the D latch circuit 152 holds this to output this from a Q terminal to the OR gate 154 (Q2 signal).

A CLR terminal of the D latch circuit 152 is a terminal for clearing the Q2 signal, and a Ref2 signal, as shown in FIG. 8(C), that outputs a low level signal at a frequency that is the approximate same as that of the Ref1 signal and in a cycle different from that of the Ref1 signal is inputted into the CLR terminal. In addition, the Ref1 and Ref2 signals are made lest low-level periods of respective signals should overlap with each other in one cycle of the PCI clock 112. Owing to this, the Q2 signal, as shown in FIG. 8(E), is cleared at the timing when the Ref2 signal becomes low and at the timing different from the timing when the Q1 signal is cleared. In other words, the D latch circuit 152 outputs a low level signal. In addition, the Ref1 and Ref2 signals are outputted from a microcomputer not shown.

The OR gate 154 logical-ORes the Q1 and Q2 signals to output its result to the MOS-FET 136.

Thus, in the driving signal output circuit 124 in the above-described configuration, as shown in FIGS. 8A, 8D, and 8E, the Q1 and Q2 signals output high level signals at different timing while the PCI clock 112 is inputted into the D latch circuits 150 and 152, and hence a high level signal is outputted from the OR gate 154.

Then, although the Q1 and Q2 signals are held just after the PCI clock 112 stops, the Q2 signal becomes low when the Ref2 signal becomes low at the timing of t1 as shown in FIGS. 8C and 8E. As shown in FIGS. 8B and 8D, when the Ref1 signal becomes low at the timing of t2, the Q1 signal becomes low, too. Owing to this, a low level signal is outputted from the OR gate 154.

In this manner, the driving signal output circuit 124 outputs a high level signal while the PCI clock 112 is supplied, and when the PCI clock 112 stops, the driving signal output circuit 124 outputs a low level signal to operate similarly to the driving signal output circuit that is described in the first embodiment.

As described above, the present invention controls the actuation/non-actuation of a cooling fan according to whether a clock is supplied to an external device. Hence, the present invention has an excellent effect that, when the external device operates, it is possible to surely actuate the cooling fan, and to sufficiently cool the external device.

What is claimed is:

1. A computer adapted for connection to one or more external devices and having a cooling fan for cooling the one or more external devices, comprising:
    an actuation means for actuating the cooling fan;
    a detection means for detecting supply of a clock from the computer to the one or more external devices; and
    a signal output means for outputting an actuation signal to the actuation means for actuating the cooling fan on the basis of the clock.

2. The computer according to claim 1,
    wherein the signal output means is operable to output an actuation signal to the actuation means for actuating the cooling fan when the clock is detected, and to output a stop signal to the actuation means for stopping the cooling fan when the clock is not detected.

3. The computer according to claim 1,
    wherein the detection means comprises integration means for integrating the clock signal in an input stage.

4. The computer according to claim 1, further comprising:
    at least one temperature sensor for detecting the internal temperature of the computer,
    wherein the signal output means is operable to output the actuation signal to the actuation means on the basis of the clock and the temperature detected by the temperature sensor.

5. The computer according to claim 4,
    wherein the signal output means is operable to output the actuation signal to the actuation means when the clock is not detected and the temperature detected by the at least one temperature sensor is equal to or larger than a predetermined value.

6. A method of controlling a cooling fan in a computer which is adapted for connection to one or more external devices and including a cooling fan for cooling the one or more external devices, comprising the steps of:
    detecting supply of a clock from the computer to the external devices, and actuating the cooling fan on the basis of the clock.

7. The method according to claim 6, further comprising the steps of:
    detecting an internal temperature of the computer, and
    actuating the cooling fan on the basis of the clock and the detected temperature.

8. An expansion unit adapted for connection to a computer system, comprising:
    at least one electronic device;
    a cooling fan for cooling said at least one electronic device;
    interface means for receiving a clock signal from said computer system;
    detection means for detecting supply of said clock signal via said interface means;
    actuation means for turning on said cooling fan responsive to a detection of said clock signal by said detection means.

9. The expansion unit according to claim 8, further comprising:
    at least one temperature sensor for detecting a temperature associated with said at least one electronic device, said actuation means turning on said cooling fan responsive to an on-detection of said clock signal and a detection by said temperature sensor of a temperature greater than a predetermined value.

10. A computer system comprising:
    a portable computer providing an external interface;
    a docking station connected to said portable computer via said external interface,
    said docking station comprising:
        at least one electronic device;
        a cooling fan for cooling said at least one electronic device;
        detection means for detecting the supply of a clock signal over said external interface;
        actuation means for turning-on said cooling fan responsive to a detection of said clock signal by said detection means.

11. The computer system according to claim 10, further comprising:
    at least one temperature sensor in said docking station for detecting a temperature associated with said at least one electronic device; said actuation means actuating said cooling fan on the basis of the detected clock signal and temperature.

* * * * *